(12) United States Patent
Satou et al.

(10) Patent No.: US 9,086,000 B2
(45) Date of Patent: Jul. 21, 2015

(54) DIESEL PARTICULATE FILTER SYSTEM

(75) Inventors: Hitoshi Satou, Fujisawa (JP); Hiroyuki Ishikawa, Fujisawa (JP); Takashi Haseyama, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 107 days.

(21) Appl. No.: 13/699,496

(22) PCT Filed: May 16, 2011

(86) PCT No.: PCT/JP2011/061220
§ 371 (c)(1),
(2), (4) Date: Nov. 21, 2012

(87) PCT Pub. No.: WO2011/148817
PCT Pub. Date: Dec. 1, 2011

(65) Prior Publication Data
US 2013/0061580 A1   Mar. 14, 2013

(30) Foreign Application Priority Data
May 25, 2010   (JP) .................. 2010-119722

(51) Int. Cl.
*F01N 3/00* (2006.01)
*B01D 53/94* (2006.01)
(Continued)

(52) U.S. Cl.
CPC ............... *F01N 3/00* (2013.01); *B01D 53/944* (2013.01); *B01D 53/96* (2013.01); *F01N 3/0235* (2013.01); *F01N 3/0238* (2013.01); *F01N 9/002* (2013.01); *F02D 41/029* (2013.01); *F02D 41/401* (2013.01); *F02D 41/402* (2013.01); *F01N 3/035* (2013.01); *F01N 3/0842* (2013.01);
(Continued)

(58) Field of Classification Search
USPC .................... 60/286, 295, 297, 311
See application file for complete search history.

(56) References Cited

U.S. PATENT DOCUMENTS 6,966,179 B2 * 11/2005 Onodera et al. ................ 60/295
7,316,107 B2 *  1/2008 Aratsuka et al. ................ 60/297
(Continued)

FOREIGN PATENT DOCUMENTS

JP    4200875    5/2005
JP    4175281    10/2005
(Continued)

OTHER PUBLICATIONS

Patent Abstracts of Japan, Publication No. 2008-180154, Published Aug. 7, 2008.
(Continued)

*Primary Examiner* — Binh Q Tran
(74) *Attorney, Agent, or Firm* — Staas & Halsey LLP (57) ABSTRACT

A diesel particulate filter ("DPF") system that suppresses clogging of a DPF and enhances convenience including accumulated particulate matter ("PM") quantity estimator for estimating an accumulated PM quantity in an idle state; and a long low idle forced regeneration unit 5 that if the accumulated PM quantity estimated by the accumulated PM quantity estimation estimator exceeds a predetermined quantity, performs long low idle forced regeneration that automatically performs regeneration of the DPF, and the long low idle forced regeneration unit, when a vehicle starts moving during long low idle forced regeneration, performs automatic regeneration of the diesel particulate filter while the vehicle is moving.

2 Claims, 6 Drawing Sheets

(51) Int. Cl.
  *B01D 53/96* (2006.01)
  *F01N 3/023* (2006.01)
  *F01N 9/00* (2006.01)
  *F02D 41/02* (2006.01)
  *F02D 41/40* (2006.01)
  *F01N 3/035* (2006.01)
  *F01N 3/08* (2006.01)
  *F01N 3/10* (2006.01)
  *F01N 3/20* (2006.01)
  *F02D 41/08* (2006.01)

(52) U.S. Cl.
  CPC ............ *F01N 3/106* (2013.01); *F01N 3/2066* (2013.01); *F01N 2900/08* (2013.01); *F01N 2900/10* (2013.01); *F01N 2900/1606* (2013.01); *F02D 41/08* (2013.01); *F02D 41/405* (2013.01); *F02D 2200/0812* (2013.01); *Y02T 10/44* (2013.01); *Y02T 10/47* (2013.01)

(56) References Cited

U.S. PATENT DOCUMENTS

| | | | | |
|---|---|---|---|---|
| 7,845,165 | B2* | 12/2010 | Satou et al. | 60/295 |
| 8,161,736 | B2* | 4/2012 | Tsukada et al. | 60/295 |
| 8,250,858 | B2* | 8/2012 | Kamiya et al. | 60/295 |
| 8,327,626 | B2* | 12/2012 | Minamikawa et al. | 60/295 |
| 8,479,499 | B2* | 7/2013 | Berke et al. | 60/295 |
| 8,646,256 | B2* | 2/2014 | Masuda | 60/295 |
| 2004/0172935 | A1* | 9/2004 | Otake et al. | 60/295 |
| 2005/0217252 | A1 | 10/2005 | Sato et al. | |
| 2007/0214778 | A1* | 9/2007 | Narita et al. | 60/299 |
| 2007/0271906 | A1* | 11/2007 | Berke et al. | 60/285 |
| 2010/0012105 | A1 | 1/2010 | Haseyama et al. | |
| 2011/0126520 | A1* | 6/2011 | Kim | 60/278 |

FOREIGN PATENT DOCUMENTS

| | | |
|---|---|---|
| JP | 2008-180154 | 8/2008 |
| JP | 2009-257323 | 11/2009 |
| JP | 2010-15281 | 1/2010 |
| JP | 2010-156281 | 7/2010 |

OTHER PUBLICATIONS

Patent Abstracts of Japan, Publication No. 2009-257323, Published Nov. 5, 2009.
Patent Abstracts of Japan, Publication No. 2005-127207, Published May 19, 2005.
Patent Abstracts of Japan, Publication No. 2010-156281, Published Jul. 15, 2010.
Patent Abstracts of Japan, Publication No. 2010-015281, Published Jan. 21, 2010.
International Search Report of PCT/JP2011/061220 mailed Aug. 23, 2011.
Written Opinion of the International Searching Authority mailed Aug. 23, 2011 in corresponding International Application No. PCT/JP2011/061220.

* cited by examiner

DIESEL PARTICULATE FILTER SYSTEM

This application claims the foreign priority benefit of Japanese Application No. 2010-119722 filed May 25, 2010, the contents of which are incorporated herein by reference, which serves as priority for PCT Application No. JP2011/061220 filed May 16, 2011.

Technical Field

The present invention relates to a diesel particulate filter ("DPF") system that traps particulate matter (hereinafter referred to as PM) in an exhaust gas from a diesel engine via a diesel particulate filter (hereinafter referred to as DPF) to reduce a quantity of PM discharged to the outside.

BACKGROUND ART

DPF systems in which PM discharged from a diesel engine is trapped by a filter called DPF to reduce a quantity of PM discharged to the outside are known. As an example of such DPF systems, ones using a continuously regenerating DPF device including a DPF and a DOC (diesel oxidation catalyst) provided on the upstream side of the DPF are known.

In a continuously regenerating DPF device, if a temperature of an exhaust gas is approximately 350° C. or higher, PM trapped by the DPF is continuously burned for purification, whereby the DPF is self-regenerated; however, if the temperature of the exhaust gas is low, a temperature of the DOC is lowered and the DOC is not activated, and thus, it is difficult to oxidize PM to self-regenerate the DPF. As a result, PM is accumulated in the DPF and clogging of the DPF is thereby developed, causing the problem of an increase in exhaust pressure.

Therefore, in DPF systems, DPF regeneration is implemented, in which when a quantity of PM accumulated in a DPF exceeds a predetermined quantity, multi-stage delayed injection (multi-injection) and subsequent injection (post-injection) of fuel in a cylinder (tube) is performed to forcibly increase a temperature of an exhaust gas flowing into the DPF to burn and remove the PM trapped in the DPF.

The multi-stage delayed injection (multi-injection) is performed to raise the temperature of the exhaust gas emitted from the engine to raise a temperature of a DOC to a catalyst activation temperature. Also, the subsequent injection (post-injection) is performed to supply a large quantity of unburned fuel into the exhaust gas to oxidize (burn) the supplied unburned fuel by means of the DOC, whereby the temperature of the exhaust gas at an entrance of the DPF is raised to a temperature equal to or exceeding a temperature at which PM is burned.

Types of the DPF regeneration include automatic regeneration and manual regeneration. Automatic regeneration refers to DPF regeneration that is automatically performed while the vehicle is moving, and manual regeneration refers to DPF regeneration that is manually performed via the driver's operation during the vehicle being stopped.

During DPF regeneration, as described above, post-injection is performed, and thus, a phenomenon called oil dilution in which an unburned fuel is mixed into an engine oil (lubricating oil) to dilute the engine oil occurs.

In automatic regeneration in which DPF regeneration is performed while the vehicle is moving, the load on the engine is not stabilized and thus, the exhaust gas temperature is not stabilized. Accordingly, in order to reliably increase the exhaust gas temperature at the entrance of the DPF, the post-injection quantity is set to be somewhat larger. Thus, in automatic regeneration, the dilution quantity, which is a quantity of fuel mixed into the engine oil, is large. Meanwhile, manual regeneration in which DPF regeneration is performed during the vehicle being stopped, the exhaust gas temperature is stabilized and thus, the post-injection quantity can be set to be small, enabling the dilution quantity to be reduced.

The dilution quantity is reduced by making the vehicle move, thereby volatilizing the fuel mixed in the engine oil; however, if a regeneration interval from an end of DPF regeneration to a start of DPF regeneration is short, the dilution quantity is continuously increased rather than being reduced, which may cause a failure.

Therefore, DPF systems are configured to, on condition that when a quantity of PM accumulated in a DPF exceeds a predetermined quantity, an accumulated dilution quantity is smaller than a predetermined threshold value and the regeneration interval is equal to or exceeds a predetermined threshold value, perform automatic regeneration, and if the aforementioned conditions are not met, urge a driver to perform manual regeneration to perform manual regeneration via the driver's operation during the vehicle being stopped.

Also, as one of types of DPF regeneration, there is LLIR (long low idle regeneration), which is performed when an idle state continues for a period of time equal to or exceeding a predetermined period of time (see, for example, patent literature 1).

In LLIR, an accumulated PM quantity in an idle state is estimated, and when the estimated accumulated PM quantity exceeds a predetermined quantity, manual regeneration is automatically performed.

CITATION LIST

Patent Literature

Patent Literature 1: Japanese Patent Laid-Open No. 2008-180154
Patent Literature 2: Japanese Patent No. 4175281

Technical Problem

In manual regeneration, it is assumed that forced regeneration is performed in a state in which the vehicle is stopped, and if the vehicle is moved during manual regeneration, the manual regeneration is stopped.

For normal manual regeneration, the driver himself/herself performs an operation to perform DPF regeneration in a situation in which there is no need to move the vehicle for a while, and thus, the driver has the awareness that the vehicle cannot be moved until the end of the DPF regeneration, and thus, the driver rarely makes the vehicle move during manual regeneration.

However, in LLIR, manual regeneration is automatically performed irrespective of the driver's intension, and thus, there may be a case where the vehicle needs to move during LLIR. If the vehicle is moved during LLIR, as in normal manual regeneration, DPF regeneration is stopped and as a result, PM is accumulated without being removed, which may cause clogging of the DPF.

In particular, in a vehicle that travels a short distance and frequently idles (for example, a fire truck), LLIR is relatively frequently performed; however, if the vehicle cannot be moved until the end of manual regeneration performed by LLIR, it is problematic from the perspective of convenience, and desired to be improved.

SUMMARY OF THE INVENTION

Therefore, an object of the present invention is to solve the aforementioned problem and provide a DPF system that performs LLIR, the DPF system suppressing clogging of a DPF and enhancing convenience.

The present invention has been made in order to achieve the above object and provides a DPF system including a diesel particulate filter provided in an exhaust pipe for an engine, the DPF system including: accumulated PM quantity estimation means for estimating an accumulated PM quantity in an idle state; and a long low idle forced regeneration unit that if the accumulated PM quantity estimated by the accumulated PM quantity estimation means exceeds a predetermined quantity, performs long low idle forced regeneration that automatically performs regeneration of the diesel particulate filter, wherein the long low idle forced regeneration unit is configured to, when a vehicle starts moving during long low idle forced regeneration, perform automatic regeneration that automatically performs regeneration of the diesel particulate filter while the vehicle is moving.

The long low idle forced regeneration unit may, if the accumulated PM quantity estimated by the accumulated PM quantity estimation means exceeds the predetermined quantity, determine whether or not automatic regeneration can be performed, and if it is determined that automatic regeneration can be performed, perform automatic regeneration when the vehicle starts moving during long low idle forced regeneration.

If it is determined that automatic regeneration cannot be performed, when the vehicle starts moving during long low idle forced regeneration, the long low idle forced regeneration unit may urge manual regeneration that performs regeneration of the diesel particulate filter while the vehicle is stopped.

The present invention provides a DPF system that suppresses clogging of a DPF and enhances convenience.

DETAILED DESCRIPTION

Hereinafter, preferred embodiments of the present invention will be described with reference to the attached drawings.

Figure 1:
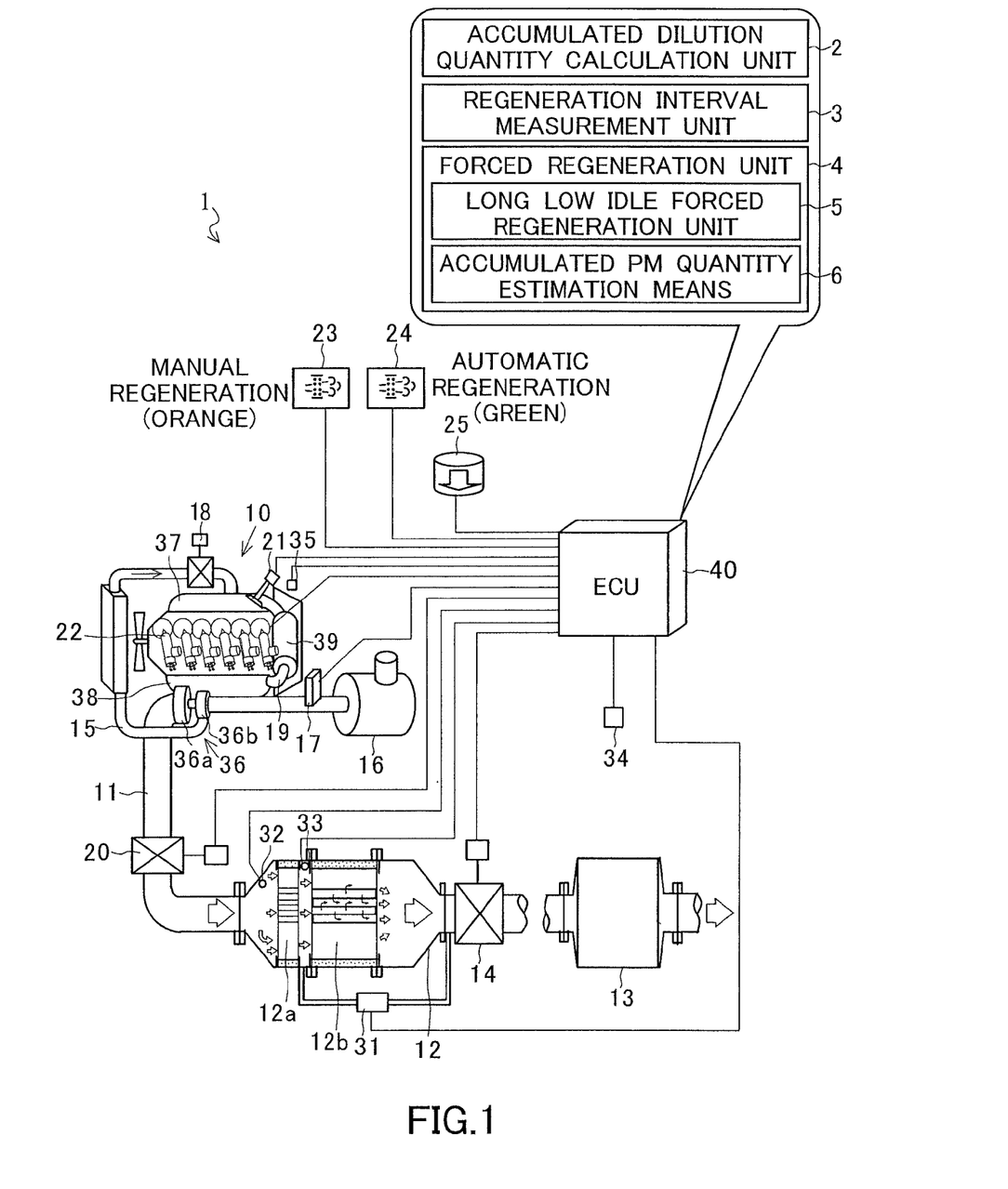
FIG. 1 is a diagram of a schematic configuration of a DPF system according to an embodiment of the present invention.
Figure 2A:
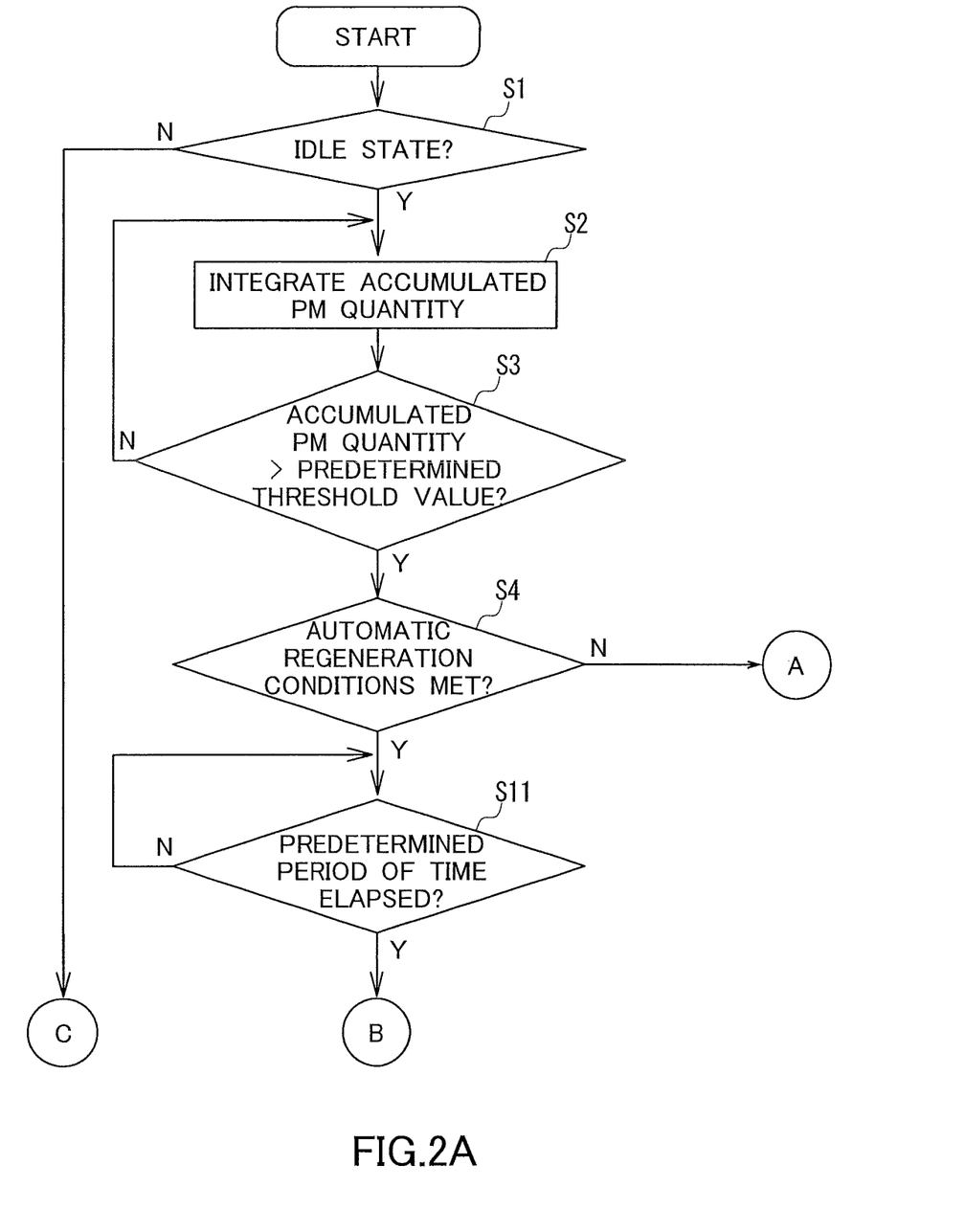
FIGS. 2A, 2B, 2C, 2D, and 2E represent a continuous flowchart illustrating a control flow for a long low idle forced regeneration unit according to the present invention.
Figure 2B:
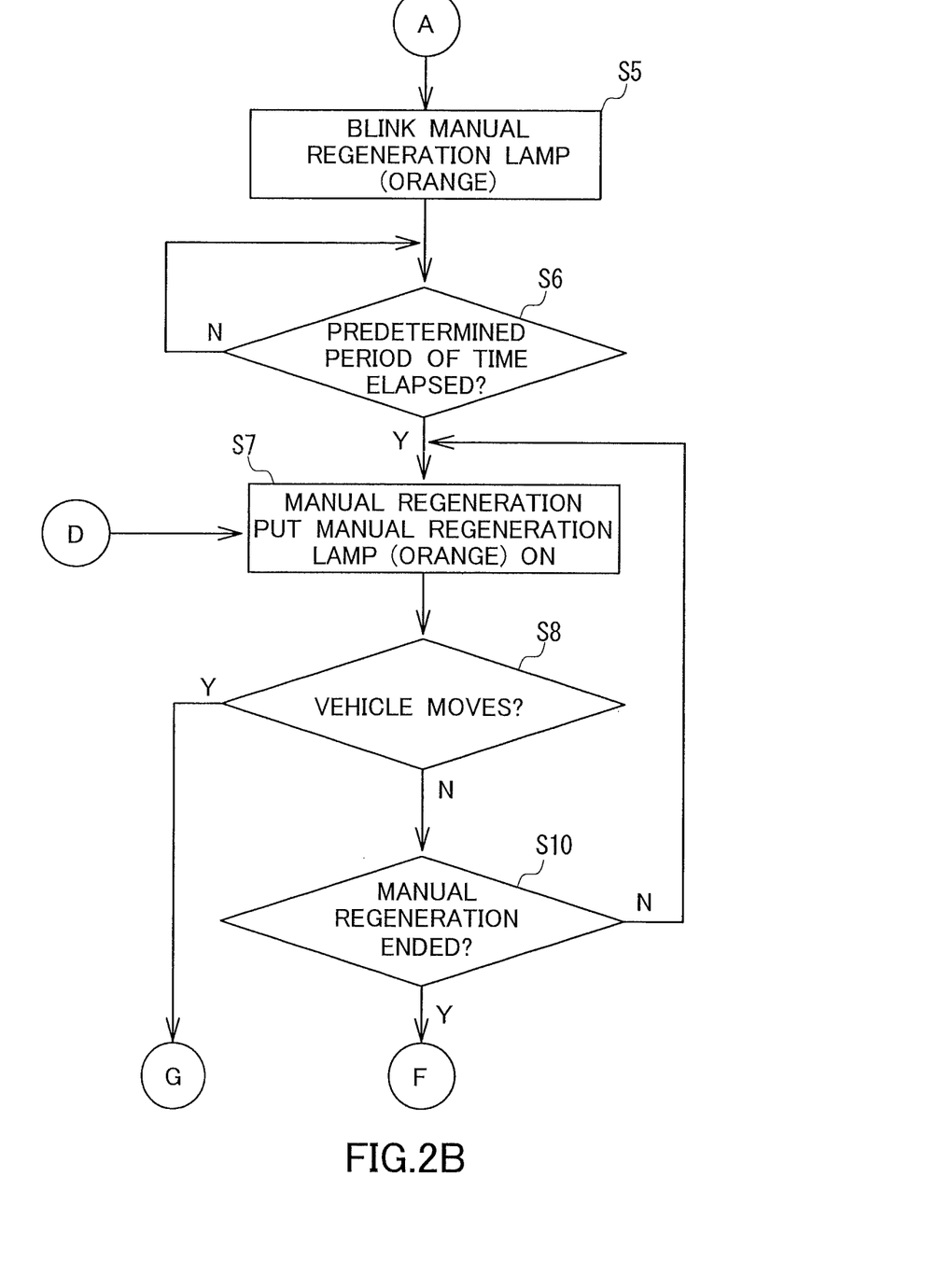
Figure 2C:
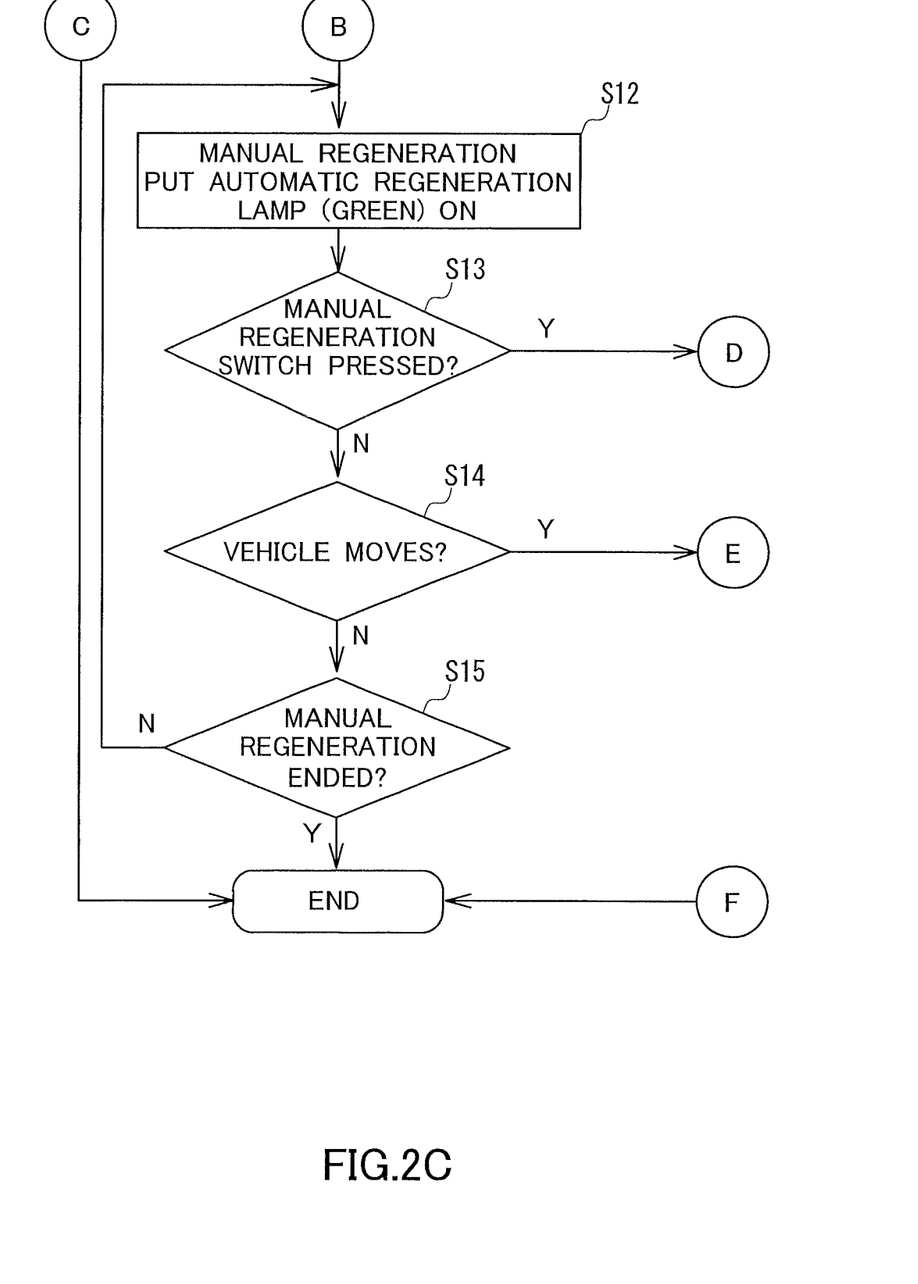
Figure 2D:
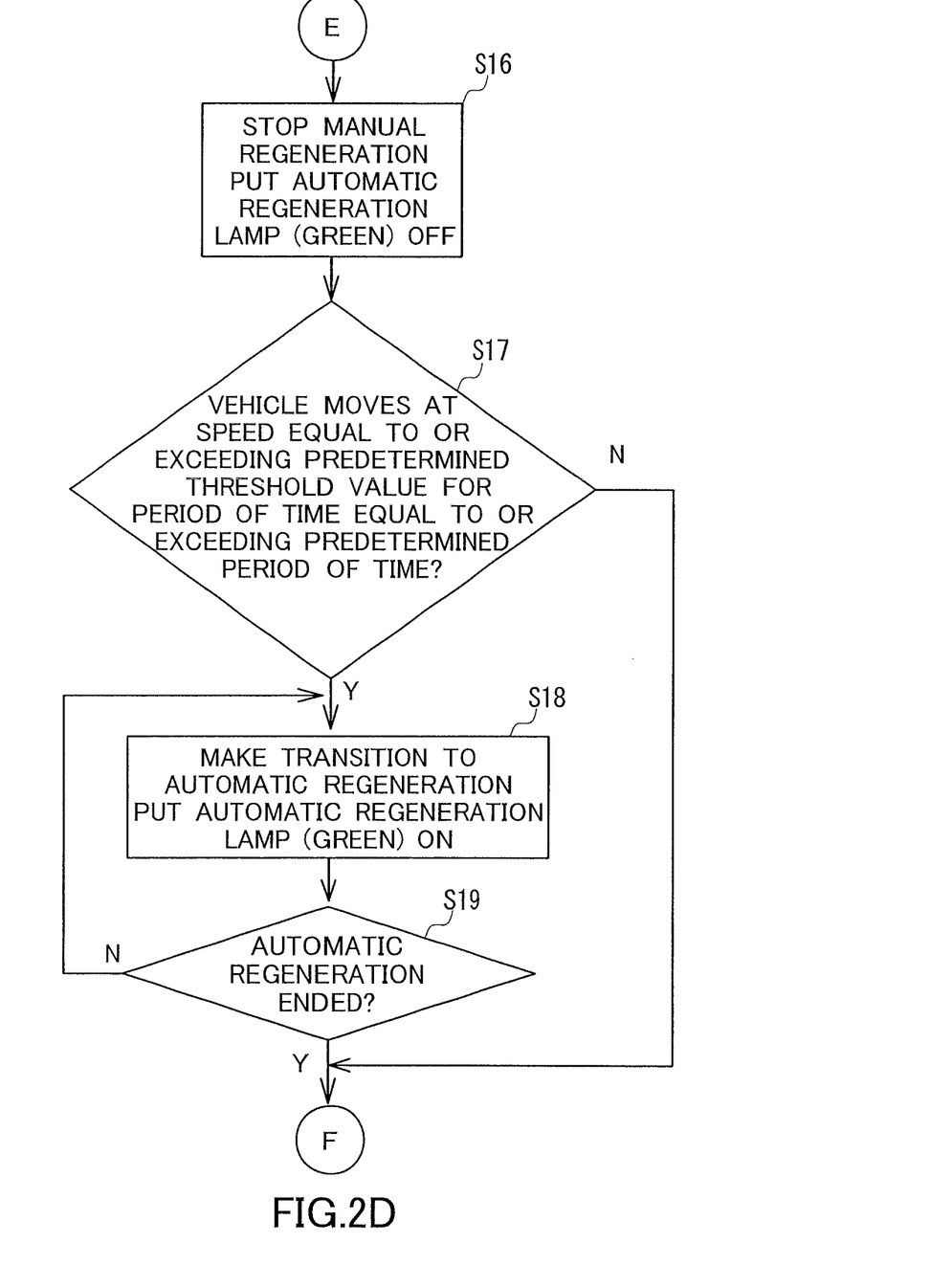
Figure 2E:
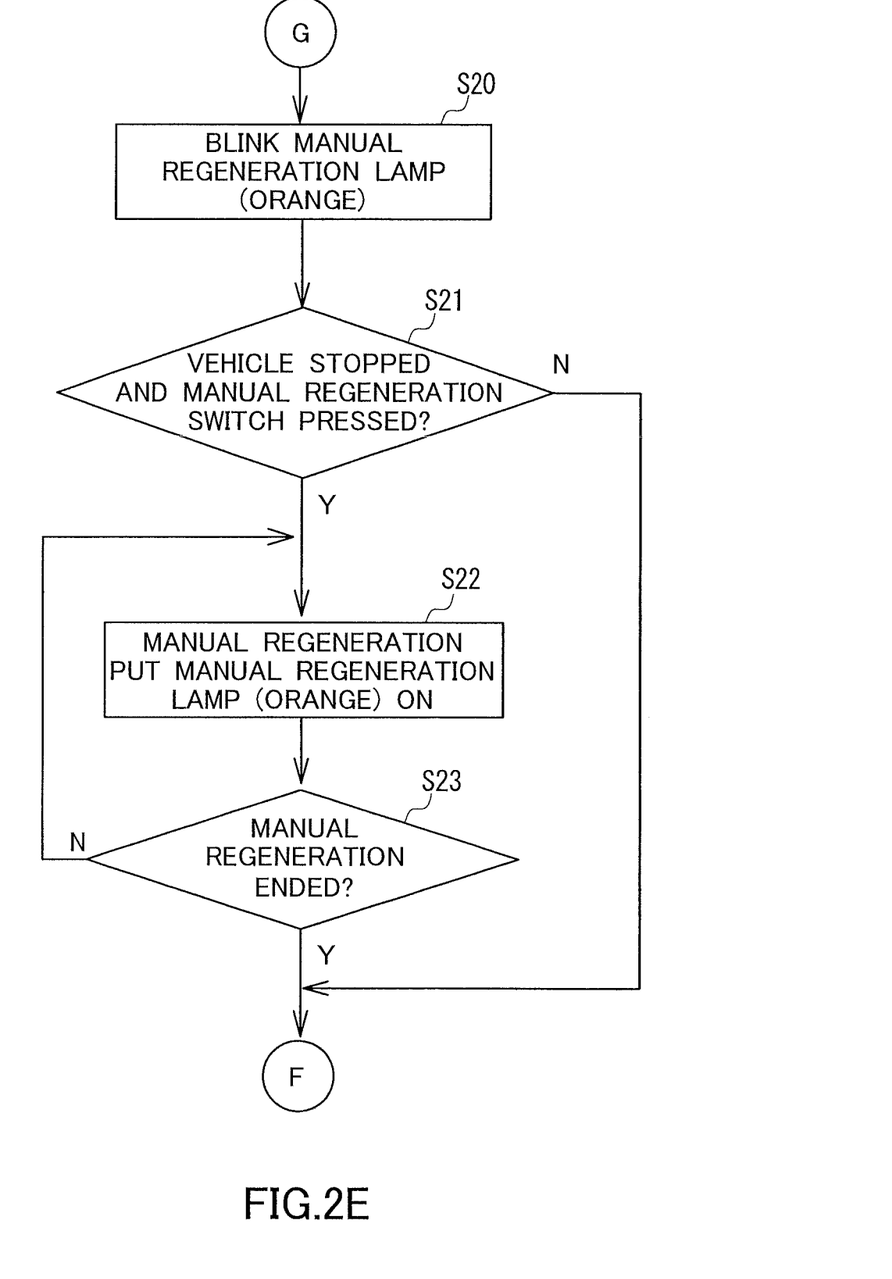

FIG. 1 is a diagram of a schematic configuration of a DPF system according to an embodiment.

As illustrated in FIG. 1, a DPF system 1 includes a DPF 12b provided in an exhaust pipe 11 for an engine 10, the DPF 12b trapping PM in an exhaust gas. In the exhaust pipe 11 for the engine 10, a continuously regenerating DPF device 12 including the DPF 12b and a DOC 12a provided on the upstream side of the DPF 12b is disposed, and in the exhaust pipe 11 on the downstream side of the continuously regenerating DPF device 12, a silencer 13 is disposed. An exhaust gas discharged from the engine 10 is purified by the continuously regenerating DPF device 12 and emitted into the atmosphere via the silencer 13.

The DOC 12a is formed by making a support having, e.g., a honeycomb structure including porous ceramic support an oxidation catalyst such as platinum. The DPF 12b includes, e.g., a monolith honeycomb-shaped wall-flow filter with entrances and exits of channels in a honeycomb including porous ceramic alternately occluded, the filter part supporting a catalyst such as platinum or cerium oxide. PM in an exhaust gas is trapped by porous ceramic walls.

A conduction pipe is connected to a front and a back of the DPF 12b, and in the conduction pipe, a differential pressure sensor 31 that detects a differential pressure between the front and the back of the DPF 12b is provided. Also, in the exhaust pipe 11 on the downstream side of the continuously regenerating DPF device 12, an exhaust throttle valve 14 is provided as exhaust throttling-down means, and in the exhaust pipe 11 on the upstream side of the continuously regenerating DPF device 12, an exhaust brake 20 is provided.

On the upstream side of the DOC 12a in the continuously regenerating DPF device 12, a DOC entrance exhaust temperature sensor 32 that detects a temperature of an exhaust gas flowing into the DOC 12a is provided, and between the DOC 12a and the DPF 12b, a DPF entrance exhaust temperature sensor 33 that detects a temperature of an exhaust gas flowing into the DPF 12b is provided.

In an intake pipe 15 for the engine 10, an air cleaner 16, a MAF sensor (intake air mass flow sensor) 17, a compressor 36b of a turbo charger 36 and an intake throttle valve 18 are provided from an intake port to the engine 10 side. The intake throttle valve 18 is provided to adjust a quantity of intake air to an intake manifold 37. An exhaust gas discharged from an exhaust manifold 38 flows into the continuously regenerating DPF device 12 through a turbine 36a of the turbo charger 36 and the exhaust brake 20.

Also, an EGR pipe 19 for returning a part of an exhaust gas discharged from the engine 10 to the intake manifold 37 is connected to the intake manifold 37 and the exhaust manifold 38, and in the EGR pipe 19, an EGR cooler 39 that cools an exhaust gas returned to the intake manifold 37 and an EGR valve 21 that adjusts an EGR quantity, which is a quantity of exhaust gas returned to the intake manifold 37 are provided.

Signals from the MAF sensor 17, the DOC entrance exhaust temperature sensor 32, the DPF entrance exhaust temperature sensor 33, a vehicle speed sensor 34, an engine rotation speed sensor 35 are input to an ECU (electronic control unit) 40 that performs overall control of the engine 10 as well as DPF regeneration control, and, e.g., the exhaust throttle valve 14, the exhaust brake 20, the intake throttle valve 18, the EGR valve 21 and a fuel injection device 22 are controlled via control signals from the ECU 40.

The DPF system 1 also includes an accumulated dilution quantity calculation unit 2, a regeneration interval measurement unit 3 and a forced regeneration unit 4. The accumulated dilution quantity calculation unit 2, the regeneration interval measurement unit 3 and the forced regeneration unit 4 are installed in the ECU 40.

The accumulated dilution quantity calculation unit 2 is configured to calculate an accumulated dilution quantity by integrating a dilution quantity increase resulting from DPF regeneration and deducting a dilution quantity decrease resulting from the vehicle running.

The regeneration interval measurement unit 3 is configured to measure a regeneration interval from an end of DPF regeneration to a start of next DPF regeneration.

The forced regeneration unit 4 is configured to, on condition that when a quantity of PM accumulated in the DPF 12b exceeds a predetermined quantity, the accumulated dilution quantity is smaller than a predetermined threshold value and the regeneration interval is equal to or exceeds a predetermined threshold value (hereinafter referred to as automatic regeneration conditions), perform automatic regeneration that automatically performs DPF regeneration while the vehicle is moving. The forced regeneration unit 4 is configured to put an automatic regeneration lamp (green) 24 on during automatic regeneration.

Also, the forced regeneration unit 4 is configured to, when the quantity of PM accumulated in the DPF 12b exceeds the predetermined quantity, if the automatic regeneration conditions are not met, urge a driver to perform manual regeneration that manually performs DPF regeneration during the vehicle being stopped so that manual regeneration is performed via the driver's operation during the vehicle being stopped. The forced regeneration unit 4 is configured to, if the quantity of PM accumulated in the DPF 12b exceeds the predetermined quantity and the automatic regeneration conditions are not met, blink a manual regeneration lamp (orange) 23 to urge the driver for manual regeneration. Also, the forced regeneration unit 4 is configured to put the manual regeneration lamp (orange) 23 on during manual regeneration. Furthermore, the forced regeneration unit 4 is configured to, upon the driver pressing a manual regeneration button (DPF manual regeneration execution switch) 25 during the vehicle being stopped, execute manual regeneration.

Here, the quantity of accumulated PM is detected based on a differential pressure between the front and the back of the DPF 12b detected by the differential pressure sensor 31 or a running distance calculated based on a vehicle speed detected by the vehicle speed sensor 34. In other words, the forced regeneration unit 4 is configured to, if a differential pressure between the front and the back of the DPF 12b exceeds a predetermined threshold value or if a running distance exceeds a predetermined threshold value, determines that the quantity of PM accumulated in the DPF 12b exceeds the predetermined quantity.

In DPF regeneration, when an exhaust gas temperature detected by the DOC entrance exhaust temperature sensor 32 or the DPF entrance exhaust temperature sensor 33 is lower than a first determination value (DOC activation temperature, for example, 250° C.), multi-injection of fuel is performed to raise the temperature of the exhaust gas discharged from the engine 10, and when the exhaust gas temperature detected by the DOC entrance exhaust temperature sensor 32 or the DPF entrance exhaust temperature sensor 33 is equal to or exceeds the first determination value, PM burning and removal control that performs post-injection is performed for forced regeneration of DPF 12b. In the PM burning and removal control, multi-injection and post-injection are combined as necessary. In manual regeneration, the exhaust brake 20 is closed until the exhaust gas temperature becomes equal to or exceeds the first determination value, so as to rapidly increase the exhaust gas temperature. Also, in manual regeneration, at the time of the PM burning and removal control, the exhaust throttle valve 14 is closed for exhaust throttling-down to raise the exhaust gas temperature.

In the DPF system 1 according to the present embodiment, the forced regeneration unit 4 includes accumulated PM quantity estimation means 6 for estimating an accumulated PM quantity in an idle state, and a long low idle forced regeneration unit 5 that, if the accumulated PM quantity estimated by the accumulated PM quantity estimation means 6 exceeds a predetermined quantity, performs LLIR (long low idle forced regeneration) that automatically performs manual regeneration.

The accumulated PM quantity estimation means 6 is means for estimating an accumulated PM quantity from, for example, elapse time (vehicle stoppage and idling time) and/or parameters that vary according to the engine rotation speed and/or the load. The accumulated PM quantity estimation means 6 is configured to integrate an accumulated PM quantity in an idle state for accumulated PM quantity estimation.

The accumulated PM quantity estimation means 6 is configured to start accumulated PM quantity integration after a lapse of a predetermined period of time from detection of an idle state. The accumulated PM quantity integration is not started at the point of time when an idle state is detected but is started after a lapse of a predetermined period of time from that point of time to prevent DPF regeneration from being started during stoppage of the vehicle for a short period of time for, e.g., a wait for traffic signal change.

In the present embodiment, the long low idle forced regeneration unit 5 is configured to, if the vehicle starts moving during LLIR, continues DPF regeneration by making a transition from the LLIR to automatic regeneration.

More specifically, the long low idle forced regeneration unit 5 is configured to, if the vehicle starts moving during LLIR, temporarily stop the LLIR, and when the vehicle moves at a speed equal to or exceeding a predetermined threshold value for a period of time equal to or exceeding a predetermined period of time, starts automatic regeneration to make a transition from the LLIR to automatic regeneration.

Also, the long low idle forced regeneration unit 5 is configured to, only if the automatic regeneration conditions (conditions that the accumulated dilution quantity is smaller than a predetermined threshold value and the regeneration interval is equal to or exceeds a predetermined threshold value) are met, make a transition from LLIR to automatic regeneration. This is because, if automatic regeneration is performed when the automatic regeneration conditions are not met, the dilution quantity increases as a result of the automatic regeneration, which may result in occurrence of a failure.

Furthermore, the long low idle forced regeneration unit 5 is configured to, if the automatic regeneration conditions are not met, when an integrated value of the vehicle stoppage and idling time exceeds a predetermined threshold value, blink the manual regeneration lamp (orange) 23, and put the manual regeneration lamp (orange) 23 on during LLIR. This is because if the vehicle is moved when the automatic regeneration conditions are not met, DPF regeneration is stopped (does not transit to automatic regeneration) and thus it is necessary to urge the driver not to make the vehicle move. Also, if the automatic regeneration conditions are not met, automatic regeneration is not performed and it is necessary to perform manual regeneration, and thus, if the integrated value of the vehicle stoppage and idling time exceeds the predetermined threshold value, the long low idle forced regeneration unit 5 blinks the manual regeneration lamp (orange) 23.

Furthermore, the long low idle forced regeneration unit 5 is configured to, if the automatic regeneration conditions are met, when the integrated value of the vehicle stoppage and idling time exceeds the predetermined threshold value, neither put on nor blink the lamps and put the automatic regeneration lamp (green) 24 on only during LLIR. A purpose of this is to notify the driver of the vehicle being allowed to move because when the automatic regeneration conditions are met, even if the vehicle is moved, DPF regeneration continues by a transition to automatic regeneration.

Also, the long low idle forced regeneration unit 5 is configured to, when the automatic regeneration conditions are met, if the manual regeneration button 25 is pressed during LLIR (during automatic regeneration lamp (green) 24 being put on), continue DPF regeneration by making a transition to normal manual regeneration. When the manual regeneration button 25 is pressed, the automatic regeneration lamp (green) 24 is put off and the manual regeneration lamp (orange) 23 is put on. In normal manual regeneration, when the vehicle is moved, DPF regeneration is stopped without a transition to automatic regeneration.

Next, a control flow for the long low idle forced regeneration unit 5 will be described with reference to FIG. 2. The long low idle forced regeneration unit 5 is configured to, when the vehicle is stopped, execute the control flow in FIG. 2.

As illustrated in FIG. 2, the long low idle forced regeneration unit 5 first determines whether or not the accumulated PM quantity estimation means 6 is in an idle state in step S1. If the result of the determination is YES in step S1, the control proceeds to step S2, and if the result of the determination is NO, the control is ended.

In step S2, the accumulated PM quantity estimation means 6 integrates an accumulated PM quantity and the control proceeds to step S3. In step S3, the long low idle forced regeneration unit 5 determines whether or not the accumulated PM quantity exceeds a predetermined threshold value. If the result of the determination is NO in step S3, the control returns to step S2, and the accumulated PM quantity integration is continued. Although not illustrated in FIG. 2, if the vehicle moves during the accumulated PM quantity integration, the accumulated PM quantity is stored and the control is ended. In next accumulated PM quantity integration, the integration starts from the stored accumulated PM quantity.

If the result of the determination is YES in step S3, in step S4, the long low idle forced regeneration unit 5 determines whether or not the automatic regeneration conditions (conditions that the accumulated dilution quantity is smaller than a predetermined threshold value and the regeneration interval is equal to or exceeds a predetermined threshold value) are met.

If the result of the determination is NO in step S4, the accumulated PM quantity exceeds the predetermined threshold value and thus, DPF regeneration is needed, and the automatic regeneration conditions are not met, and thus, it is necessary to perform manual regeneration. Therefore, the long low idle forced regeneration unit 5 blinks the manual regeneration lamp (orange) 23 in step S5, and after a wait for a predetermined period of time in step S6, automatically performs manual regeneration (LLIR) in step S7. Here, the long low idle forced regeneration unit 5 puts the manual regeneration lamp (orange) 23 on to urge the driver not to make the vehicle move.

Subsequently, in step S8, the long low idle forced regeneration unit 5 determines whether or not the vehicle moves. If the result of the determination is YES in step S8, the control proceeds to step S20. If the result of the determination is NO in step S8, whether or not the manual regeneration is ended is determined in step S10, and if the result of the determination is NO in step S10, the control returns to step S7 and the manual regeneration is continued, and if the result of the determination in step S10 is YES, the control is ended.

In step S20, the manual regeneration lamp (orange) 23 is blinked and the control proceeds to step S21. In step S21, the long low idle forced regeneration unit 5 determines whether or not the manual regeneration button 25 is pressed when the vehicle is stopped. If the result of the determination is NO in step S21, the control is ended.

If the result of the determination in step S21 is YES, manual regeneration (LLIR) is automatically performed in step S22. Here, the long low idle forced regeneration unit 5 puts the manual regeneration lamp (orange) 23 on to urge the driver to not to make the vehicle move. Subsequently, in step S23, whether or not the manual regeneration is ended is determined, and if the result of the determination in step S23 is NO, the control returns to step S22 and the manual regeneration is continued, and if the result of the determination in step S23 is YES, the control is ended.

Meanwhile, if the result of the determination in step S4 is YES, after a wait for a predetermined period of time in step S11, the long low idle forced regeneration unit 5 automatically performs manual regeneration (LLIR) in step S12. Here, the long low idle forced regeneration unit 5 puts the automatic regeneration lamp (green) 24 on.

Subsequently, in step S13, the long low idle forced regeneration unit 5 determines whether or not the manual regeneration button 25 is pressed. If the result of the determination in step S13 is YES, the control proceeds to step S7 and a transition to normal manual regeneration is made. In this case, the automatic regeneration lamp (green) 24 is put off and the manual regeneration lamp (orange) 23 is put on.

If the result of the determination in step S13 is NO, in step S14, the long low idle forced regeneration unit 5 determines whether or not the vehicle moves. If the result of the determination in step S14 is NO, in step S15, whether or not the manual regeneration is ended is determined, and if the result of the determination in step S15 is NO, the control returns to step S12 and the manual regeneration is continued, and if the result of the determination in step S15 is YES, the control is ended.

If the result of the determination in step S14 is YES, in step S16, the long low idle forced regeneration unit 5 stops the manual regeneration and puts the automatic regeneration lamp (green) 24 off. After stoppage of the manual regeneration, the control proceeds to step S17.

In step S17, the long low idle forced regeneration unit 5 determines whether or not the vehicle moves at a speed equal to or exceeding a predetermined threshold value for a period of time equal to or exceeding a predetermined period of time. If the result of the determination in step S17 is NO, the control is ended in that state.

If the result of the determination in step S17 is YES, in step S18, the long low idle forced regeneration unit 5 starts automatic regeneration and puts the automatic regeneration lamp (green) 24 on. Subsequently, in step S19, whether or not the automatic regeneration is ended is determined, and if the result of the determination in step S19 is NO, the control returns to step S18 and the automatic regeneration is continued, and if the result of the determination in step S19 is YES, the control is ended.

As described above, in the DPF system 1 according to the present embodiment, the long low idle forced regeneration unit 5 is configured to, when the vehicle starts moving during LLIR, continue DPF regeneration by making a transition from the LLIR to automatic regeneration.

Consequently, DPF regeneration can be continued even if it is necessary to make the vehicle move during LLIR, enabling suppression of clogging of the DPF. Also, DPF regeneration can be continued even if the vehicle is moved during LLIR, eliminating the need to wait for an end of manual regeneration performed by LLIR without making the vehicle move, and thus, the convenience is enhanced. The present invention is effective particularly for vehicles that travel a short distance and frequently idle, i.e., relatively frequently perform LLIR (for example, fire trucks).

Also, in the DPF system 1, the long low idle forced regeneration unit 5 is configured to, if the vehicle starts moving during LLIR, temporarily stop the LLIR and if the vehicle moves at a speed equal to or exceeding a predetermined threshold value for a period of time equal to or exceeding a predetermined period of time, start automatic regeneration to make a transition from the LLIR to automatic regeneration, and thus, in the case of, e.g., a short-distance and short-time travel inside a construction site, as in normal manual regeneration, DPF regeneration can be stopped to prevent a transition to automatic regeneration. This is because: in automatic regeneration, DPF regeneration is not completed during the vehicle being stopped, and when the vehicle is stopped during automatic regeneration, it is necessary to press the manual regeneration button 25 to switch to manual regeneration, and if a transition to automatic regeneration is made upon a short-distance and short-time travel, the frequency of the driver's operation is increased, which is cumbersome.

Also, in the DPF system 1, the long low idle forced regeneration unit 5 is configured to make a transition from LLIR to automatic regeneration only if the automatic regeneration conditions (conditions that the accumulated dilution quantity is smaller than a predetermined threshold value and the regeneration interval is equal to or exceeds a predetermined threshold value) are met, enabling prevention of an increase in dilution quantity and occurrence of a failure.

Furthermore, in the DPF system 1, the long low idle forced regeneration unit 5 is configured to, if the automatic regeneration conditions are not met, when the integrated value of the vehicle stoppage and idling time exceeds a predetermined threshold value, blink the manual regeneration lamp 23 and puts the manual regeneration lamp 23 on during LLIR, and if the automatic regeneration conditions are met, put the automatic regeneration lamp 24 on only during LLIR.

In a conventional DPF system, if the integrated value of the vehicle stoppage and idling time exceeds a predetermined threshold value, the manual regeneration lamp 23 is blinked and during LLIR, the manual regeneration lamp 23 is put on to urge a driver not to make the vehicle move. However, with the conventional DPF system, in the case of a vehicle that travels a short distance and frequently idles (for example, a fire truck), the manual regeneration lamp 23 frequently blinks, if the driver presses the manual regeneration button 25 in response to the blinking of the manual regeneration lamp 23 or manual regeneration is started by LLIR (manual regeneration lamp 23 is put on) in such situation, the problem that the vehicle cannot move until the end of the manual regeneration occurs, and an improvement is desired from the perspective of convenience.

Meanwhile, in the DPF system 1 according to the present invention, the manual regeneration lamp 23 is blinked or put on only if the automatic regeneration conditions are not met and manual regeneration is necessary, and if the automatic regeneration conditions are met, even though the vehicle moves, a transition to automatic regeneration can be made and thus the automatic regeneration lamp 24 is put on, enabling suppression of the manual regeneration lamp 23 frequently blinking even in the case of a vehicle that travels a short distance and frequently idles, and thus, enhancement in convenience can be achieved.

The present invention is not limited to the above-described embodiments and it should be understood that addition of various alterations are possible without departing from the spirit of the present invention.

The invention claimed is:

1. A diesel particulate filter system, comprising:
a diesel particulate filter provided in an exhaust pipe of a vehicle engine;
a sensor for detecting whether the engine is in an idle state;
a sensor for detecting whether the vehicle is moving;
an accumulated particulate matter quantity estimation device for estimating an accumulated particulate matter quantity during a detection of the idle state of the engine; and
a long low idle forced regeneration unit that, when the estimated accumulated particulate matter quantity exceeds a predetermined quantity, starts long low idle forced regeneration that automatically performs regeneration of the diesel particulate filter,
wherein the long low idle forced regeneration unit is configured to, when the vehicle is detected as starting to move during the long low idle forced regeneration,
stop the long low idle forced regeneration, and
determine whether or not the vehicle is moving at a speed equal to or exceeding a predetermined threshold value for a period of time equal to or exceeding a predetermined period of time, and if so, start automatic regeneration that automatically performs the regeneration while the vehicle is moving, and continue the automatic regeneration, to thereby transition from the long low idle forced regeneration to the automatic regeneration,
wherein, the accumulated particulate matter quantity estimation device starts an integration of the accumulated particulate matter quantity after a lapse of a predetermined period of time from the detection of the idle state, estimating the accumulated particulate matter quantity during the idle state of the engine, and
wherein the long low idle forced regeneration unit is configured to, when the estimated accumulated particulate matter quantity exceeds a predetermined quantity,
reduce the accumulated particulate matter quantity by performing the long low idle forced regeneration and
determine whether or not the automatic regeneration can be performed, and if so, then when it is detected that the vehicle is starting to move during the long low idle forced regeneration, stop the long low idle forced regeneration and determine whether or not the vehicle is moving at the speed equal to or exceeding the predetermined threshold value for the period of time equal to or exceeding the predetermined period of time, and if so, start the automatic regeneration, and continue the automatic regeneration, to thereby transition from the long low idle forced regeneration to the automatic regeneration.

2. The system according to claim 1, wherein, the long low idle forced regeneration unit is configured to, when the estimated accumulated particulate matter quantity exceeds the predetermined quantity,
reduce the accumulated particulate matter quantity by performing the long low idle forced regeneration and
determine whether or not the automatic regeneration can be performed, and if so, then when it is detected that the vehicle starts moving during the long low idle forced regeneration, the long low idle forced regeneration unit urges manual regeneration.

* * * * *